Patented July 31, 1928.

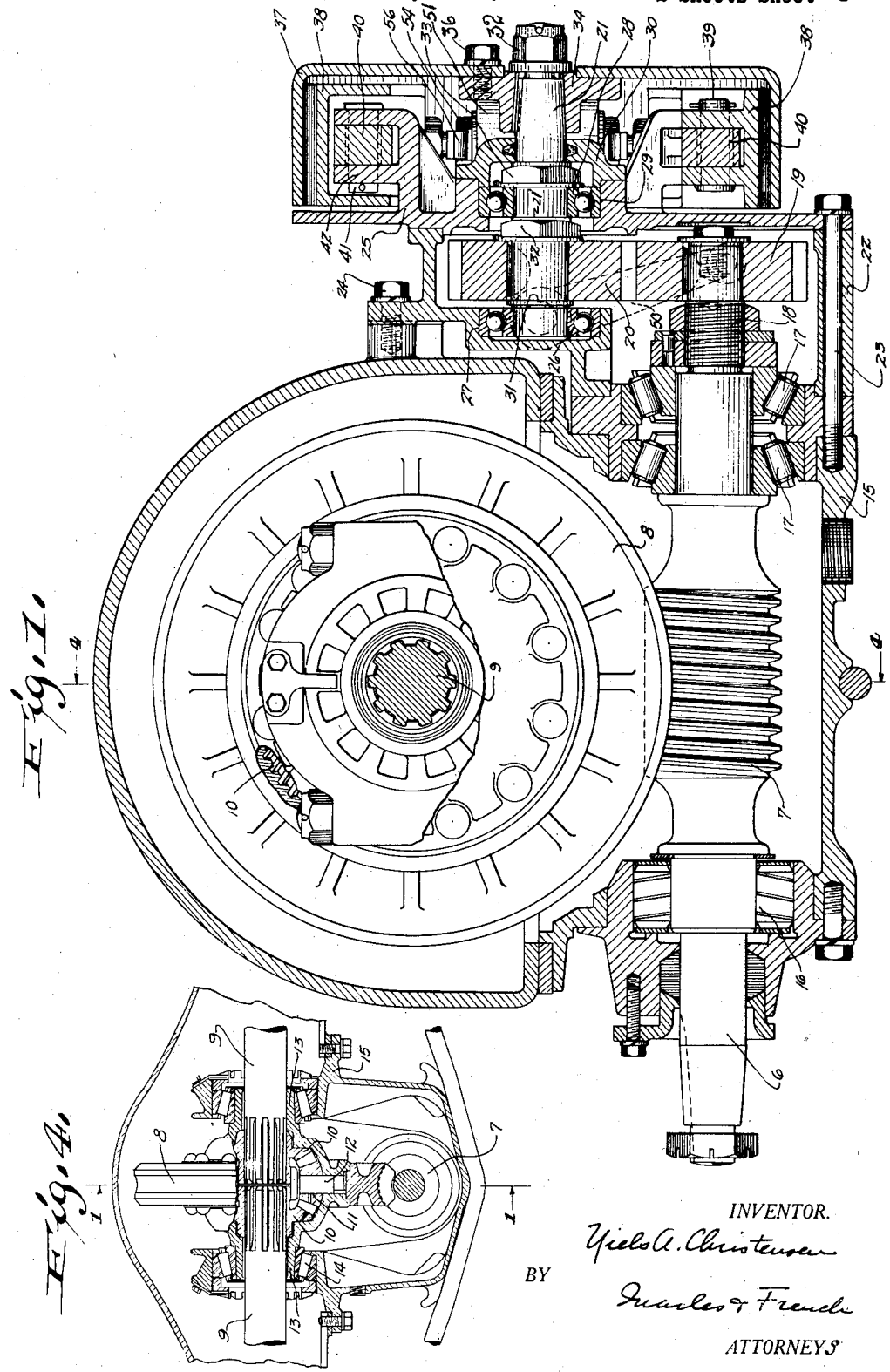

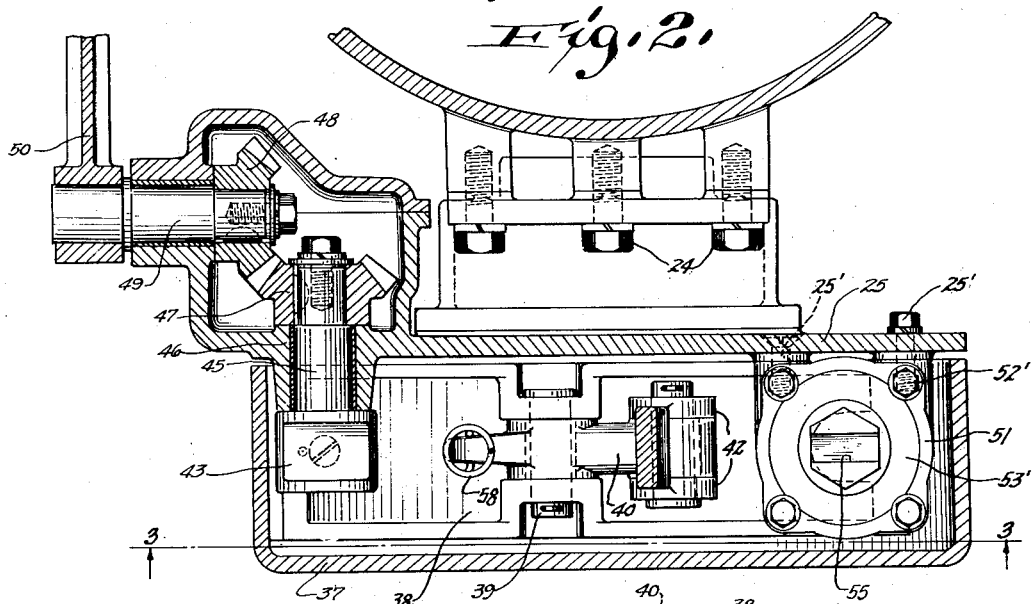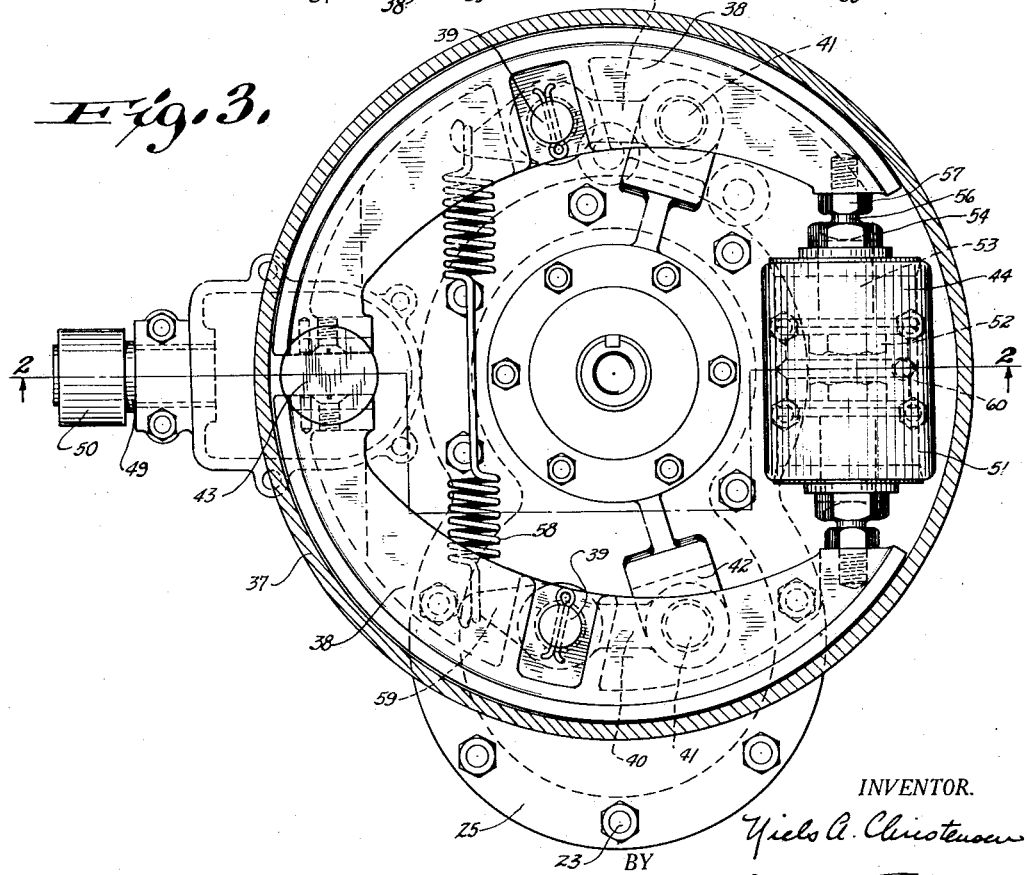

1,679,154

UNITED STATES PATENT OFFICE.

NIELS A. CHRISTENSEN, OF CLEVELAND, OHIO.

TRANSMISSION BRAKE MECHANISM.

Application filed April 24, 1926. Serial No. 104,323.

The invention relates to brakes, and more particularly to brakes for automotive vehicles.

In automotive vehicles it is, in some instances, desirable to not only provide a braking force upon drums directly associated with the rear wheels, but to provide an additional braking source associated with the transmission mechanism between the engine and the rear axle. In some constructions of automotive vehicles mechanical difficulties are presented in directly mounting a brake on the propeller shaft and to obviate these difficulties the present invention has been designed to provide a brake which is associated with but not directly mounted upon the propeller shaft, and is preferably located so that it is firmly and rigidly attached to the rear axle housing of the vehicle.

The invention further consists in the several features hereinafter set forth and more particularly defined by claims at the conclusion hereof.

In the drawings, Fig. 1 is a vertical sectional view through brake mechanism embodying the invention, showing it associated with the transmission shaft, the section being taken transversely of said shaft along the line 1—1 of Fig. 4;

Fig. 2 is a detail view, partly in section, taken on the line 2—2 of Fig. 3;

Fig. 3 is a detail sectional view taken on the line 3—3 of Fig. 2;

Fig. 4 is a detail sectional view taken on the line 4—4 of Fig. 1.

Referring to Figs. 1 and 4, the numeral 6 designates a pinion shaft which is adapted to be connected up in known manner by the usual propeller shaft with the engine at the front of the vehicle. This shaft has a worm gear 7 formed or mounted thereon, meshing with a worm-wheel 8 forming the ring gear of the differential associated with the rear axle or axles 9, said axles having beveled gears 10 mounted thereon, meshing with planetary pinions 11 mounted on stud shafts 12 carried by the worm-wheel 8 whose hub portions 13 are journalled in bearings 14 mounted in bearing retainers associated with the rear axle housing 15.

The construction thus far described is well known, and by it the rear axles 9 receive their power through the worm-gear driven differential from the engine. However, in the present instance the pinion shaft 6 is of special construction in that in addition to being journalled in the bearings 16 and 17 it includes an extension 18 carrying a gear 19. The gear 19 meshes with a gear 20 mounted on what may be termed an idler shaft or brake shaft 21.

The housing 22 is rigidly secured to the rear axle housing 15 by long bolts 23 adjacent the gear 19 and by shorter bolts 24 in the upper part of the housing 22. In addition, this housing includes a cover plate 25 which is secured to the main body 22 of the housing by bolts 23. The brake shaft 21 is journalled at its inner end in a ball-bearing 26 whose outer race is mounted in a recess 27 in the inner side of the housing member 22 and said shaft is also journalled in a ball-bearing 28 whose outer race is mounted in a recess 29 in the cover plate section 25, a cap 30 being shown associated with the cover plate 25 adjacent the bearing 28.

The gear 20 is keyed to the shaft 21 and held against longitudinal displacement by a shoulder 31 on said shaft and a nut 32, and a nut 33 is also mounted on said shaft adjacent the bearing 28 and clamps the inner race of said bearing against a shoulder 21' on said shaft. The outer end of the shaft 21 is tapered to receive the hub 34 secured thereto by a nut 35. Bolts 36 secure the brake drum 37 to its hub 34.

Any suitable brake mechanism may be associated with the brake drum 37, and hence when a brake, carried by the relatively stationary parts of the housing, such as the plate 25, is brought into braking engagement with the drum 37, a braking action will be exerted upon the shaft 21 and hence through the gears 20 and 19 upon the shaft 6 and thus a braking action is exerted upon the rear axles and the transmission mechanism associated therewith.

The brake mechanism associated with the drum 37 is more particularly shown in Fig. 3 and includes a pair of brake shoes 38. Each of the shoes is medially pivotally connected by a pin 39 with the free end of an anchor pin link 40 whose other end is connected by a pin 41 with a forked extension 42 of the cover plate or brake support 25.

The brake shoes 28 are in this instance associated at one of their ends with a manually-operable expander 43, and at their other ends with a fluid-pressure-operated motor or actuator 44. The expander cam 43 has its shaft 45 journalled in a bearing 46 in the housing member 22 and carries a beveled gear 47 meshing with a beveled gear 48 mounted on a manually-operable shaft 49 which carries a crank arm 50 designed to be operated by linkage from the operator's station on the vehicle in the usual well-known manner.

The fluid-pressure-operated motor includes a brake cylinder 51 having a pair of suitably packed and oppositely moving pistons 52 working therein, each provided with a piston or thrust-rod 53 having a slotted hexagonal head 54 and receiving within the slot 55 the flattened head of a jackscrew or abutment 56 whose threaded end is adjustably mounted in the adjacent end of the shoe 38 and secured in adjusted position by a locknut 57.

A spring 58 is connected at its ends to hooked lugs 59 on the links 40 to normally move and maintain the shoes 38 out of braking engagement with the drum 37. When, however, the expander 43 is oscillated through the oscillation of the crank arm 50, the ends of the shoes adjacent said expander will be moved forwardly and consequently cause an outward movement of the shoes into braking engagement with the drum, the shoes fulcruming about the thrust members of the motor. When fluid pressure is introduced through a port 60 into the cylinder between the pistons and the pistons 52 move outwardly, a thrust will be imparted to the jackscrews 56 and a consequent outward movement be imparted to the shoes 38, the shoes then fulcruming on the expander and being moved into braking engagement with the drum. Both the manual and fluid-pressure-operated means may be operated together, to move the shoes bodily into engagement with the drum, or either of them may be operated to move the brake shoes into braking engagement with the drum. Upon a release of either of these means the springs 58 move the shoes clear of the drum to a release position.

The particular form of brake-operating mechanism and its association with the link-supported brake members 38 as disclosed herein is more particularly described and claimed in my copending application Serial No. 715,752, filed May 24, 1924.

I desire it to be understood that this invention is not to be limited to any particular form or arrangement of parts except in so far as such limitations are included in the claims.

What I claim as my invention is:

1. In brake mechanism for vehicles, the combination with the rear axle, the pinion shaft and the gearing connection between said shaft and axle, of a brake shaft having a transmission connection with said pinion shaft separate from said gearing connection, and brake mechanism associated with said brake shaft.

2. In brake mechanism for vehicles, the combination with the differential and the pinion shaft and the driving connection therebetween, of brake mechanism having a transmission connection with said shaft separate from the driving connection between said shaft and differential.

3. In brake mechanism for vehicles, the combination with the differential and the pinion shaft and the driving connection therebetween, of brake mechanism having a geared connection with said pinion shaft separate from the driving connection between said shaft and differential.

4. In brake mechanism for vehicles, the combination with the rear axle housing, the differential, the pinion shaft and the driving connection between said differential and pinion shaft disposed in said housing, a gear housing secured to said rear axle housing and including a brake support, a brake shaft mounted on said gear housing, a gearing connection between said brake shaft and pinion shaft separate from the driving connection between said differential and pinion shaft, a brake drum mounted on said brake shaft, and a brake member associated with said brake support and engageable with said drum.

In testimony whereof, I affix my signature.

NIELS A. CHRISTENSEN.